(12) United States Patent
Dietz (10) Patent No.: US 7,568,716 B2
(45) Date of Patent: Aug. 4, 2009

(54) METHOD AND APPARATUS FOR ALIGNMENT OF TRAILER HITCH

(76) Inventor: Dan L. Dietz, 10234 Emerald, Houston, TX (US) 77074

( * ) Notice: Subject to any disclaimer, the term of this patent is extended or adjusted under 35 U.S.C. 154(b) by 0 days.

(21) Appl. No.: 10/908,471

(22) Filed: May 13, 2005

(65) Prior Publication Data

US 2006/0255560 A1 Nov. 16, 2006

(51) Int. Cl.
B60D 1/36 (2006.01)
(52) U.S. Cl. ...................... 280/477; 348/148
(58) Field of Classification Search ........... 280/432, 280/477, 504, 511; 33/286; 250/330, 491.1; 342/53; 356/51; 372/4; 340/691.6, 686.6, 340/473, 431, 435, 901, 902, 903, 937; 348/14.02, 348/207.99, 148; 396/155, 153
See application file for complete search history.

(56) References Cited

U.S. PATENT DOCUMENTS

| | | | |
|---|---|---|---|
| 2,197,157 A | 4/1940 | Reynolds | |
| 2,797,406 A | 6/1957 | Tanis et al. | |
| 2,844,390 A | 7/1958 | Smith | |
| 3,418,628 A | 12/1968 | Fenner | |
| 3,825,921 A | 7/1974 | Marus et al. | |
| 3,918,746 A | 11/1975 | Lehtisaari | |
| 3,924,257 A | 12/1975 | Roberts | |
| 4,030,775 A | 6/1977 | Hill | |
| 4,065,147 A | 12/1977 | Ross | |
| 4,187,494 A | 2/1980 | Jessee | |
| 4,192,526 A | 3/1980 | Myers | |
| 4,285,138 A | 8/1981 | Berry | |
| 4,432,563 A | 2/1984 | Pitcher | |
| 4,723,788 A | 2/1988 | Suter | |
| 4,905,376 A | 3/1990 | Neeley | |
| 4,988,116 A | 1/1991 | Evertsen | |
| 5,035,441 A | 7/1991 | Murray | |
| 5,108,123 A | 4/1992 | Rubenzik | |
| 5,113,588 A | 5/1992 | Walston | |
| 5,269,554 A | 12/1993 | Law et al. | |
| 5,558,352 A | 9/1996 | Mills | |
| 5,650,764 A | 7/1997 | McCullough | |
| 5,669,621 A | 9/1997 | Lockwood | |
| 5,680,706 A | 10/1997 | Talcott | |
| 5,729,194 A | 3/1998 | Spears et al. | |
| 5,821,852 A | 10/1998 | Fairchild | |
| 5,861,814 A | 1/1999 | Clayton | |
| 5,951,035 A | 9/1999 | Phillips, Jr. et al. | |
| 6,002,326 A * | 12/1999 | Turner | 340/426.1 |
| 6,100,795 A | 8/2000 | Otterbacher et al. | |
| 6,222,457 B1 | 4/2001 | Mills et al. | |
| 6,341,794 B1 | 1/2002 | Hunter | |
| 6,454,290 B1 | 9/2002 | Turner | |
| 6,517,098 B2 | 2/2003 | Grasso et al. | |
| 6,550,949 B1 * | 4/2003 | Bauer et al. | 362/545 |
| 6,612,603 B2 | 9/2003 | Alger | |
| 6,690,413 B1 * | 2/2004 | Moore | 348/148 |
| 6,712,378 B1 | 3/2004 | Austin | |
| 6,765,607 B2 | 7/2004 | Mizusawa et al. | |
| 6,827,363 B1 | 12/2004 | Amerson | |
| 6,846,001 B2 | 1/2005 | Seksaria et al. | |
| 6,846,017 B2 | 1/2005 | Martin | |
| 6,851,504 B2 * | 2/2005 | Campbell et al. | 180/271 |

(Continued)

Primary Examiner—George B. Nguyen
Assistant Examiner—Michael Stabley (57) ABSTRACT

A system for facilitating the backing of a vehicle to couple a hitch and trailer, the system including one or more cameras providing visual images to the vehicle driver to assist in backing the vehicle and making the coupling.

6 Claims, 6 Drawing Sheets

U.S. PATENT DOCUMENTS

| | | |
|---|---|---|
| 6,851,696 B1 | 2/2005 | Hensley |
| 6,860,501 B2 | 3/2005 | Schmidt et al. |
| 6,863,294 B1 | 3/2005 | Bonham |
| 6,871,868 B2 | 3/2005 | Pogue |
| 6,874,804 B2 | 4/2005 | Reese et al. |
| 6,886,968 B1 | 5/2005 | Hamelink et al. |
| 6,896,282 B1 | 5/2005 | McKinley |
| 6,913,277 B2 | 7/2005 | Mrofka et al. |
| 6,923,463 B1 | 8/2005 | Ford et al. |
| 6,931,906 B2 | 8/2005 | Sorgi |
| 6,932,374 B1 | 8/2005 | Timms et al. |
| 6,970,184 B2 | 11/2005 | Hirama et al. |
| 2003/0234512 A1* | 12/2003 | Holub ........................ 280/432 |

* cited by examiner

METHOD AND APPARATUS FOR ALIGNMENT OF TRAILER HITCH

BACKGROUND OF THE INVENTION

1. Field of the Invention

The present invention relates to hitches. In another aspect, the present invention relates to hitches, and to methods, apparatus and products for engagement of hitches with trailers and the like.

2. Brief Description of the Related Art

For many years now vehicles that are temporarily connected to trailers have been used to transport boats, off-road vehicles, lawn maintenance equipment, and other vehicles. Generally, a hitch assembly connected to the towing vehicle and trailer is employed to permit their interconnection.

Standard trailer hitches commonly include a socket on the tongue of a trailer for connection with a ball mounted on the towing bar of the towing vehicle. Coupling of the ball and socket requires the driver of the motor vehicle to rearwardly maneuver the vehicle until the ball of the hitch is vertically aligned with the socket of the trailer. Without assistance, the driver typically has difficulty maneuvering the ball into position for engagement with the socket since the ball and socket are outside the driver's field of vision. Even with assistance, vertical alignment of the trailer hitch components may be a frustrating and time consuming task. Additionally, damage to the vehicle or trailer is a real possibility with such blind maneuvering.

For even experienced drivers, hookup requires much trial and error. Generally, the driver must back up slowly and repeatedly stop the vehicle and exit the vehicle to determine the new location of the hitch with respect to the trailer hitch so as to not damage the vehicle. This is undesirable for user's who utilize trailers often such as farmers. Hence, there is a need for a trailer hitch alignment system that allows a user to conveniently align a vehicle with a trailer hitch without the user having to exit the vehicle.

As would be expected, many devices have been put forth to solve this problem, dating back a number of years and extending to the present. Most such devices include a pair of co-operating visual aids, one secured to the trailer and the other secured to the towing vehicle, so that alignment of the hitch components may be made by maneuvering the vehicle from the driver's seat. Representative of these are U.S. Pat. Nos. 3,918,746, 4,285,138 and 4,065,147. Most of these devices are either impractical, easily damaged, or prohibitively expensive. Some hitching assemblies have complicated pivoting components and mechanical guiding members permitting less precise positioning of the vehicle by the operator. (U.S. Pat. Nos. 2,197,157 and 2,844,390)

Other devices recognize the shortcomings of all of the line of sight devices, and provide for "blind" coupling, depending upon electronic sensors, signal transmitters and the like.

Many of these devices, however, are electromechanical, in that some physical connection between the towed and the towing vehicle is necessary. U.S. Pat. No. 4,030,775 utilizes a spool of wire with a micro-switch connected to a display to show how much of the wire is extended or retracted, which indicates relative coupling positions of the hitch components. Similarly, U.S. Pat. No. 4,432,563 utilizes a wire, with the added provision for indication of the direction of deviation of the wire from axial alignment as the towing vehicle maneuvers. Other patents utilizing a combination of electronics, display, and switching devices include U.S. Pat. No. 2,797, 406 (hitch contact switches carried by towing vehicle), U.S. Pat. No. 3,418,628 (position switches tripped by ball) and U.S. Pat. No. 4,187,494 (flexure of a member utilized as a sensing means for indication of relative angular and linear positions). U.S. Pat. No. 3,825,921 utilizes a wave emitter on the towing vehicle and a wave receiver coil on the trailer. A current is induced in the coil, which is monitored to show relative positions of the emitter and receiver coils. The physical connection between the towing and the towed vehicles is in this case an electrical conductor. However, a considerable number of components and electrical controls are necessary.

In contrast, U.S. Pat. No. 3,924,257 issued Dec. 2, 1975, to Roberts, employs no mechanical connection between the trailer and towing vehicle. The '257 patent discloses a trailer hitch guidance system for assisting the operator of a towing vehicle, during the backing of the later, provides a transmitter on the vehicle to be towed and a receiver on the towing vehicle which receives a signal from the transmitter and detects from the amplitude and the polarity of the respective coordinate signals generated thereby, the direction and proximity of the towing vehicle with respect to the towed vehicle.

U.S. Pat. No. 4,192,526, issued Mar. 11, 1980, to Myers, discloses a hitch guide assembly comprising a target post vertically positioned above a socket member of a towed vehicle and sighting means vertically positioned above a ball member of a towing vehicle. The sighting means comprises a V-shaped mounting bracket which magnetically couples to the towing vehicle and has an extension arm pivotally attached to the mounting bracket. The sighting means further includes a guide pointer which may be selectively positioned along the extension arm so that, when combined with the pivoted adjustment of extension arm, the outer end portion of the guide pointer is substantially positioned over the coupling member of the towing vehicle.

U.S. Pat. No. 4,285,138, issued Aug. 25, 1981, to Berry, discloses aligning devices for aligning a towing vehicle with a trailer wherein the towing vehicle has a ball and the trailer vehicle a socket carrying arm. A pair of magnetic bases having vertically positionable wands are placed one on the towing vehicle and one on the trailer. Each wand has an elastic gromet slidable along its length for retaining a signal flag on its upper side and to permit passage between the wand and the gromet of a plumb line. There are two plumb lines and two plumb bobs which when the lines are vertical and the two plumb bobs positioned immediately above the ball and the trailer socket, the alignment flags will be horizontal so that when the vehicle is backed toward the trailer unit the flags cross then hookup can be effectuated.

U.S. Pat. No. 4,723,788, issued Feb. 9, 1988, to Suter, discloses an apparatus for facilitating the alignment of a trailer hitch socket with the ball mounted on the towing vehicle is provided wherein a couple of interfitting masts are used. The first mast mounts atop the socket on the trailer tongue and extends vertically upward high enough to the point which it is visible from the towing vehicle. The second mast has a collar to engage it on the ball of the trailer hitch attached to the towing vehicle. It also extends upwardly to a height at which it is visible from within the towing vehicle. As the vehicle backs up toward the trailer, the driver can see the two masts and steer such that they will come closer and closer together and finally nest together when the socket is directly over the ball.

U.S. Pat. No. 4,905,376, issued Mar. 6, 1990, to Neeley, discloses a hitch viewing mirror assembly detachably mounts directly to the tow vehicle, either a special tail-gate clamping means for a pick-up truck or a magnetic mount for a passenger car, thus the tow view operator may view the two vehicle hitch member and the trailer hitch member while operating the tow vehicle during the coupling process thereby providing a particularly effective method of aligning the position of the hitch members.

U.S. Pat. No. 4,988,116, issued Jan. 29, 1991, to Evertson, discloses a trailer hitch positioning aid having a magnetic switching unit mounted upon the hitch ball and a corresponding permanent magnetic field unit secured to the socket of the hitch. The magnetic switches are mounted about the ball in a triangular pattern, while the magnetic field is in a "U" shape, so that closing of one or more of the magnetic switches indicates relative position of the hitch ball and socket. No physical connection is necessary between the trailer and the towing vehicle.

U.S. Pat. No. 5,035,441, issued Jul. 30, 1991, to Murray, discloses a visual aid to assist a driver in maneuvering a towing vehicle toward a trailer or other vehicle to be towed for precisely aligning the hitch components of the two vehicles. The device mounts only to the towed vehicle and includes an integral bumper member to protect the vehicles should the driver back too far. The device is adaptable to all conventional trailer hitch components and is simple and easy to use. It comprises a universal adaptor, a sighting mast and a strap for attaching the assembly to the towed vehicle. The mast can be mounted in the vertical position for viewing through the back window or at an angle to extend laterally past the side of the tow vehicle to allow the driver to view the mast even if rearward visibility is blocked through the rear window of a tow vehicle. The mast is disturbed from its rest position when the hitch components are aligned. The device is also designed such that it can be mounted to a vehicle to provide an early warning signal to the driver of closely approaching an object.

U.S. Pat. No. 5,108,123, issued Apr. 28, 1992, to Rubenzik, discloses a vehicle docking device includes a matrix of sensors arranged in a planar array of rows and columns spaced apart from one another. The matrix of sensors is mounted proximate the hitch ball of the towing vehicle in a horizontal plane. An activator is supported in a predetermined position relative to the towing hitch of the vehicle to be towed for activating one of the sensors closest thereto. The activator is positioned to be directed at the center point of the sensor matrix when the hitch ball is directly under the towing hitch. The sensor matrix is electrically coupled to a corresponding array of indicators disposed near the driver of the towing vehicle. Each indicator is associated with a corresponding sensor. By observing the array of indicators, the driver can determine whether the hitch ball and towing hitch are aligned, or in what direction correction is required.

U.S. Pat. No. 5,113,588, issued May 19, 1992, to Walston, discloses a trailer hitch alignment guide device, for a ball and socket hitch, wherein the guides can be mounted either to the rear or side, wherein the sighting elements on the guides are visually emblematic of the coupling elements, where one sighting element is isomorphic of the hitch ball and the other sighting element is isomorphic of the socket, and where the sighting elements are scribed with lines which visually amplify deviations from alignment.

U.S. Pat. No. 5,269,554, issued Dec. 14, 1993, to Law et al., discloses an alignment guide includes a plurality of guide assemblies, one of which is mounted to a trailer hitch ball and the other mounted to a trailer tongue, wherein the guides each include telescoping vertical leg members for alignment and communication relative to one another for the positioning of a trailer hitch tongue relative to an associated trailer ball.

U.S. Pat. No. 5,558,352, issued Sep. 24, 1996 to Mills, discloses a trailer hitch alignment device which allows the driver of a vehicle to align the hitch of the driven vehicle with that of its trailer with no aid from another individual. The invention utilizes two masts having acrylic flags attached thereto mounted upon the hitch components of the respective vehicles to provide visual reference points for the driver. The acrylic flags are bright in color which allow them to be sufficiently illuminated by the reverse lights of the towing vehicle during times of darkness, thereby making night-time hitch alignment possible. Each mast is mounted to a hitch component via a dome-shaped base having several magnets underneath. The magnets provide the attraction force necessary to mount the masts to the hitch components and the shape of the mounting bases provide the bases with the ability to mounted upon virtually any hitch configuration. The mountings are further secured through the use of velcro-type straps which extend from the mounting bases to the hitch components. This enhances stability and, therefore, performance, of the invention when alignment is required over rough terrain or high winds. The invention further has a swing arm offset bracket to allow for the mounting of the masts on towing vehicles having spare tires mounted on their rear.

U.S. Pat. No. 5,650,764, issued Jul. 22, 1997, to McCullough, discloses a visual aid for assisting a driver backing up a towing vehicle to a drawn vehicle. A visual display includes a flat screen upon which are depicted images in the form of silhouettes or like simulations of the respective vehicles. This effect is provided by partially and selectively illuminating the screen. A sensor is placed on at least one of the vehicles for detecting relative alignment therebetween and proximity thereof. The sensor generates a signal which controls the screen. The silhouettes are moved on the screen in proportion to the actual relationship of the two vehicles. In a preferred embodiment, the image of the towing vehicle is stationary, and the image of the drawn vehicle moves responsive to input from the sensor. The sensor may employ an emitting coil and an induction coil, or may be of the reflected energy type, such as radar and infrared radiation. The display control preferably comprises a microprocessor. The visual aid has an on-off switch, a proximity readout, and an alarm annunciating the presence of an object interposed between the tow vehicle and the draft vehicle.

U.S. Pat. No. 5,669,621, issued Sep. 23, 1997, to Lockwood, discloses a device for facilitating the alignment of a trailer hitch socket with the ball mounted on the towing vehicle is composed of a fixed sight member, a pivoting sight member, and a stop plate. The pivoting sight member mounts on the edges of the trailer tongue and extends vertically upward to the point which it is visible from the towing vehicle. The fixed sight member is magnetically attached to the towing vehicle and mounted adjacent the towing ball on the trailer hitch. The fixed sight member extends vertically upward to a height at which it is visible from within the towing vehicle. As the vehicle backs up toward the trailer, the driver can see the two sight members and steer such that they will come closer and closer together. When the socket is directly over the ball the pivoting sight member is actuated and signals the driver that alignment is achieved. The stop brace prevents the towing vehicle from colliding with the trailer hitch.

U.S. Pat. No. 5,680,706, issued Oct. 28, 1997, to Talcott, discloses a device for alignment of a trailer and a towing vehicle which consists of a visible mast placed on the trailer tongue to allow the towing vehicle driver to view the mast and to easily back into a correct position for coupling with the trailer. The mast has a pivotable arm which can be secured in either an extended contact position or a relaxed, downward position as necessary.

U.S. Pat. No. 5,729,194, issued Mar. 17, 1988, to Spears et al., discloses various configurations of components to provide for either informing an operator of a vehicle of relative positions of the vehicle and a stationary trailer during a backing procedure or informing the operator of an arrival at a hitchable position during the backing procedure. Three general embodiments are disclosed which include use of a magnetically activated switch, use of an autofocus assembly and use of a light reflective arrangement. Several possible combinations of the separate embodiments are explained which enhance the function of the assemblies to ensure proper positioning of the vehicle relative to the stationary trailer. Explanations of each embodiment are provided along with numerous variations to each. Each of the embodiments rely upon a component, or group of components, located on the vehicle which require a power source to operate. When it is a requirement that a component be placed upon the stationary trailer, that component does not require a source of power. An explanation of various modes of informing the operator of the feedback from the deployed components are presented. These include both audio feedback as well as visual feedback.

U.S. Pat. No. 5,821,852, issued Oct. 13, 1988, to Fairchild, discloses an apparatus for indicating axial alignment or deviation from alignment, and proximity between a tow vehicle and a trailer towards which the tow vehicle must be maneuvered. The apparatus comprises a storage reel mounted on the tow vehicle for storing and paying out a cord, a pulley having a magnet for mounting the pulley temporarily on the trailer hitch, and a take up reel mounted on the tow vehicle for applying tension to the cord. As the tow vehicle is maneuvered, changes in relative position between tow vehicle and trailer cause the cord to change length and angular orientation relative to the tow vehicle. These changes are sensed as one or both of the storage reel and take up reel rotate responsive to cord changes. A plurality of switches make or break contact to a matrix of indicating lamps located in the cabin of the tow vehicle, the indicating lamps indicating position of the tow vehicle relative to the trailer. The reels are permanently or temporarily mounted on the tow vehicle. The pulley has a magnet for temporary, readily removable attachment to the trailer hitch.

U.S. Pat. No. 5,861,814, issued Jan. 19, 1999, to Clayton, discloses a new trailer hitch with sensor system for allowing for easier alignment for coupling with a trailer. The inventive device includes a hitch portion secured to a rear portion of a towing vehicle. The hitch portion has an upper ball portion. The upper ball portion has a pair of sensors disposed therein. Each of the sensors are connected to a central wire. The central wire extends interiorly of the vehicle. A trailer tongue extends outwardly from a trailer. The trailer tongue has a ball socket formed within a free end thereof. The ball socket is dimensioned for receiving the upper ball portion of the hitch portion therein. The ball socket has a magnet disposed therein for being sensed by the sensors of the upper ball portion. A display box is positioned interiorly of the vehicle. The display box is in communication with the central wire of the pair of sensors. The display box provides signals related to a proximity of the trailer tongue to the hitch portion.

U.S. Pat. No. 5,951,035, issued Sep. 14, 1999, discloses a trailer hitch alignment system which includes an alerting device and a tow bar assembly for attachment to a towing vehicle. The tow bar assembly includes a photoelectric sensor for detecting the vertical alignment of a trailer tongue. The tow bar assembly has a hitch ball with a spherical top and a cylindrical body for coupling with a trailer tongue having a semi-spherical socket. In one embodiment, the photoelectric sensor is mounted on the tow bar of the tow bar assembly, adjacent to the hitch ball. In another embodiment, the hitch ball houses the photoelectric sensor within its interior. During operation, the driver of the towing vehicle typically maneuvers the vehicle toward the trailer in a rearward direction. Once the photoelectric sensor detects the vertical alignment of the socket with the ball, the alerting device is activated informing the driver of the alignment.

U.S. Pat. No. 6,100,795, issued Aug. 8, 2000, to Otterbacher et al., discloses a trailer hitch alignment system for allowing a user to easily align a hitch of a vehicle with a trailer hitch. The inventive device includes a control that is mountable to a visor of the vehicle in view of the driver, a receiver unit attachable to the bumper of the vehicle and in communication with the control unit, a transmitter unit removeably attachable to a trailer hitch that transmits a locating signal that is detectable by the receiver unit, and a storage case. Electronic circuitry within the control unit determines the position of the transmitter unit from the receiver unit from the reception of the locating signal. The control unit includes a turn right indicator and a turn left indicator for visually indicating to the user whether to turn left or right while backing toward the conventional trailer. The control unit also includes a buzzer and stop indicator light for indicating to the user when the ball hitch is positioned below the coupler of the trailer hitch. The control unit also includes a display screen that visually indicates the position of the vehicle with respect to the trailer hitch. If the user needs to turn left or right, either the turn left indicator or the turn right indicator will display various levels of lights indicating to the user that they must turn appropriately for proper alignment of the vehicle with the conventional trailer.

U.S. Pat. No. 6,222,457, issued Apr. 24, 2001, to Mills et al., discloses a trailer hitching system and method is provided for facilitating an operator's maneuvering of a towing vehicle hitch component into alignment with a towed vehicle hitch component to enable mechanical interconnection of the hitch components. The trailer hitching system includes an alignment sensor attached to either the towing vehicle or the towed vehicle for emitting a light beam over a field of view. A reflector attached to the other of the towing vehicle or the towed vehicle is mounted at a predetermined location relative to the alignment sensor. The reflector reflects a portion of the light beam emitted from the alignment sensor. An alarm in the alignment sensor emits an audible alarm in response to detecting a portion of the reflected light beam. The activation of the audible alarm indicates that the reflector is within the field of view of the alignment sensor and thereby the hitch components are moving towards alignment.

U.S. Pat. No. 6,341,794, issued Jan. 29, 2002, to Hunter, discloses a trailer hitch alignment apparatus comprising a first guide member removably attached to a vehicle bumper and a second guide member removably attached to a trailer hitch socket. The first guide member includes a magnetic base with a telescopically extensible rod adjustably coupled thereto. The second guide member includes a magnetic base having an upwardly extending telescopic rod and a downwardly extending semi-flexible shaft attached thereto. The shaft extends downwardly through a bore defined by the trailer hitch tongue so as to contact the trailer hitch ball when the ball and socket are aligned. Contact between the shaft and ball causes vertical displacement of the shaft and guide rod. Therefore, the two telescopic guide rods, visible from a driver's seat, facilitates lateral alignment of the ball and socket while vertical displacement of the second rod indicates perfect forward alignment.

U.S. Pat. No. 6,612,603, issued Sep. 2, 2003, to Alger, discloses a trailer hitch alignment hitch system uses height adjustable stanchions with length adjustable arms terminating in mirrors. The stanchions are respectively connectible to a tow vehicle and a trailer and placed so that the mirror is aligned vertically over the hitch connection component of the tow vehicle and the trailer and adjusted so that the respective mirrors are at different heights. The tow vehicle operator backs the tow vehicle until the mirrors visually indicate vertical alignment by one mirror coming into place below the other mirror and obstructing the view of the hitch component.

U.S. Pat. No. 6,517,098, issued Feb. 11, 2003, to Grasso et al., discloses an alignment device to align a vehicle's trailer hitch ball neck assembly with a trailer hitch socket assembly or tongue assembly. The invention includes two units, each having uprights with engaging press on members. The ball neck upright member has a "C"-shaped bottom portion for frictionally engaging the neck of the trailer hitch ball neck, and the hitch engaging upright member has a "U"-shaped bottom portion for frictionally engaging the outer housing of the hitch socket member around its lower end periphery. When used in conjunction with each other, the two poles visually assist the vehicle operator in aligning the vehicles so that they may be easily coupled together for towing.

U.S. Pat. No. 6,454,290, issued Sep. 24, 2002, to Turner, discloses a trailer hitch alignment device has a base block for placement on the coupler of a trailer. The block has a magnet at its bottom for being connected to the coupler and a series of apertures directed at varying angles to receive an upright post inclined at a selected angle. A cross arm extending generally horizontally is connected to the post in a manner such as to allow adjustments in vertical and horizontal directions. The post-to-cross arm connection has pair of block members through which the post and cross arm pass and a spring biasing the members together.

U.S. Pat. No. 6,712,378, issued Mar. 30, 2004, to Austin, discloses a trailer hitch alignment device is provided having a hitch alignment guide and a ball target mast. The hitch alignment guide has a vertically disposed, elongated alignment mast affixed to a magnetic, disc shaped hitch base. The ball target mast is composed of a vertically disposed, elongated alignment mast affixed to a magnetic, ring shaped ball base. The masts are telescoping shafts having linearly spaced alignment indicia are provided in a linearly spaced manner along the upper portion of the shafts.

U.S. Pat. No. 6,765,607, issued Jul. 20, 2004, to Mizusawa et al., discloses a driving aiding system for displaying a picked-up image of a rear-view camera equipped onto a rear portion of a vehicle on a screen of a displaying means arranged at a position which can be viewed from a driver's seat when the vehicle is to be backed, a locus estimated line of a hitch which is equipped onto a rear portion of the vehicle is superposed on the picked-up image of the rear-view camera to display when a predetermined instruction input is received.

U.S. Pat. No. 6,827,363, issued Dec. 7, 2004, to Amerson, discloses an alignment apparatus for assisting a driver in directing coupling engagement between a towing vehicle hitch and a trailer hitch. The apparatus includes a guide carried by the towing vehicle representing the position of the towing vehicle hitch for being visible to the driver. A target is carried by the trailer representing the position of the trailer hitch for being visible to the driver. The target has a pair of laterally spaced posts defining a target zone for receiving the guide to align the towing vehicle hitch with the trailer hitch for coupling engagement. A sensor is carried by the guide for determining whether the guide is within the target zone. An indicator is operatively associated with the sensor for indicating to the driver when the guide is within the target zone to alert the driver of alignment between the towing vehicle hitch and the trailer hitch for coupling engagement.

In spite of the many advancements in the art of trailer hitches and the coupling of such hitches with a trailer, there exists a need in the art for improved apparatus, methods and products for coupling a hitch and trailer.

This and other needs in the art will become apparent to one of skill in the art upon review of this specification, including its drawings and claims.

SUMMARY OF THE INVENTION

It is an object of the present invention to provide for improved apparatus, methods and products for coupling a hitch and trailer.

This and other objects of the present invention will become apparent to one of skill in the art upon review of this specification, including its drawings and claims.

According to one embodiment of the present invention, there is provided an image capture apparatus comprising a camera suitable for capturing both visible light images and infrared light images, an infrared light source supported by the camera, and a visible light source supported by the camera.

According to another embodiment of the present invention, there is provided a vehicle backing apparatus for assisting in coupling a hitch supported by the vehicle with a trailer, the apparatus comprising, a first camera positioned to provide an image of the trailer, a second camera positioned to provide an image of the hitch, a monitor system for displaying the image of the trailer and the image of the hitch. In a further embodiment of this embodiment, the camera is suitable for capturing both visible light images and infrared light images, and comprises an infrared light source supported by the camera and a visible light source supported by the camera. In an even further embodiment of this embodiment, at least one of the first camera or the second camera is adapted for positioning on the vehicle or the trailer to provide security monitoring of either the vehicle or the trailer. In a still further embodiment of this embodiment, at least one of the first or second cameras comprises a motion sensor.

According to even another embodiment of the present invention, there is provided a vehicle backing apparatus which comprises at least one camera generally positioned to provide an overhead field of view, which by the very nature of being directed mostly downwardly toward the hitch will exclude a view of the trailer tongue during the first portion of the backing operation, and will include a view of trailer tongue only during the second portion of the backing operation. In fact, while it is possible to navigate a vehicle backward toward the trailer using mirrors and by looking over-the-shoulder, the last part of the backing operation is much more delicate. Thus, if one were to prioritize the cameras, it would be this camera that would be favored.

According to still another embodiment there are provided methods of making, positioning, using, and operating the above apparatus.

According to yet another embodiment of the present invention, there is provided a method of backing a vehicle with a hitch toward a trailer to couple the trailer with the hitch, the method comprising, viewing the trailer through a first camera while backing the vehicle toward the trailer, and then viewing the hitch through a second camera while backing the vehicle toward the trailer.

These and other embodiments of the present invention will become apparent to one of skill in the art upon review of this specification, including its drawings and claims.

BRIEF DESCRIPTION OF THE DRAWINGS

In the drawings, it should be understood that like references numbers refer to like elements.

DETAILED DESCRIPTION OF THE INVENTION

Figure 1:
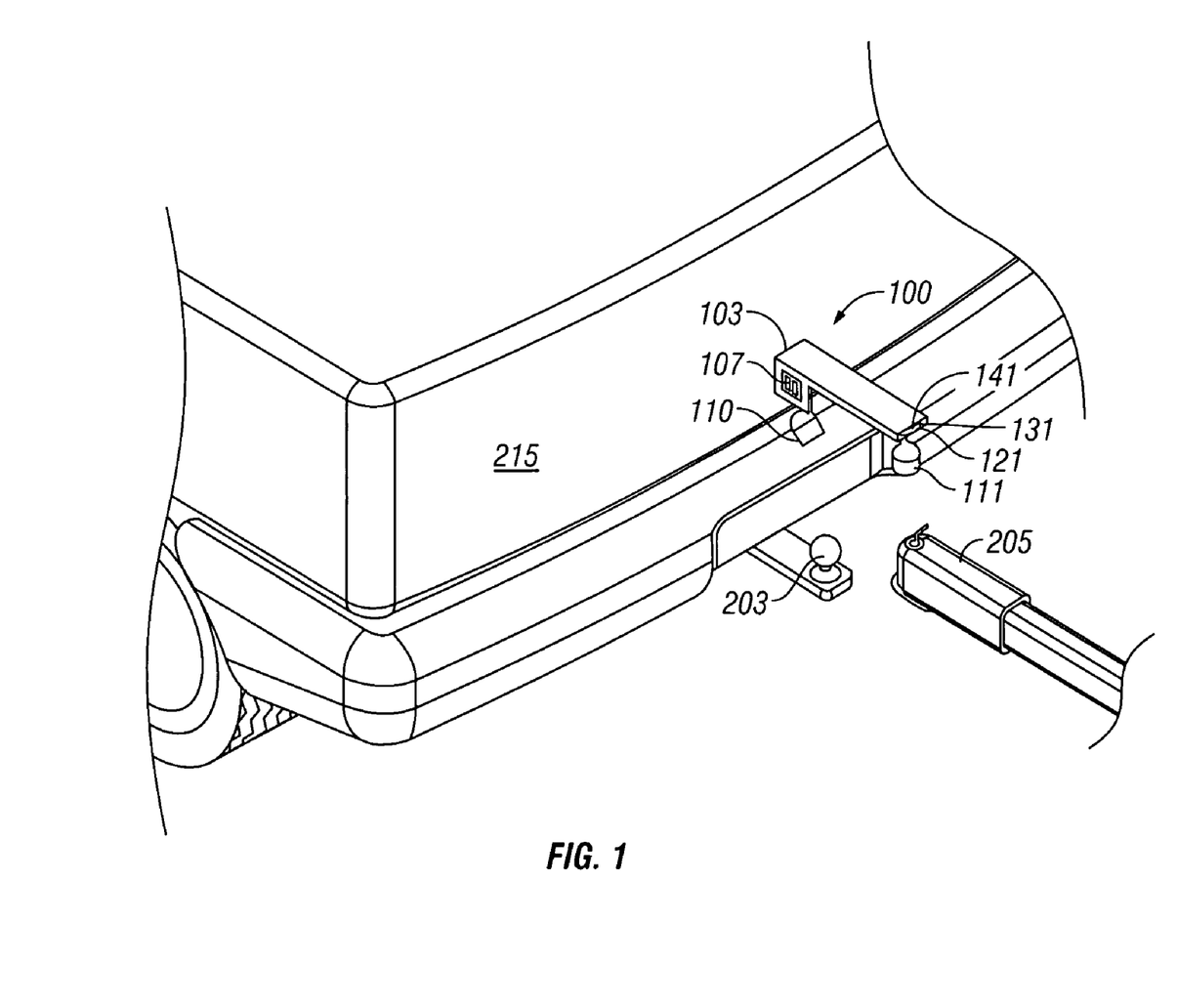
FIG. 1 is an illustration showing backing apparatus 100 mounted on vehicle 215, showing support bracket 101, mounted thereon camera 110 and camera 111, trailer hitch 203, and trailer tongue 205.

The present invention is most easily described by reference to the drawings. Referring first to FIG. 1, there is shown an illustration of backing apparatus 100, showing support bracket 101 mounted to vehicle 215, and trailer hitch 203, and trailer tongue 205.

Figure 2:
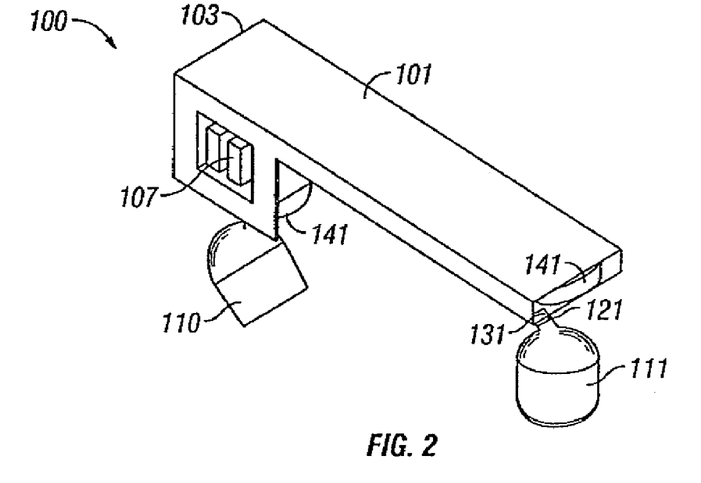
FIGS. 2, 3 and 4, are isometric, side and front views, respectively, of backing apparatus 100 of FIG. 1, showing support bracket 101, with camera 110 mounted thereon by magnetic base 141, with ball and socket joint members 121 and 131 allowing swivel of camera 110, and showing camera 111 mounted to bracket 101 with magnetic base 141, with ball and socket joint members 121 and 131 allowing swivel of camera 111.
Figure 3:
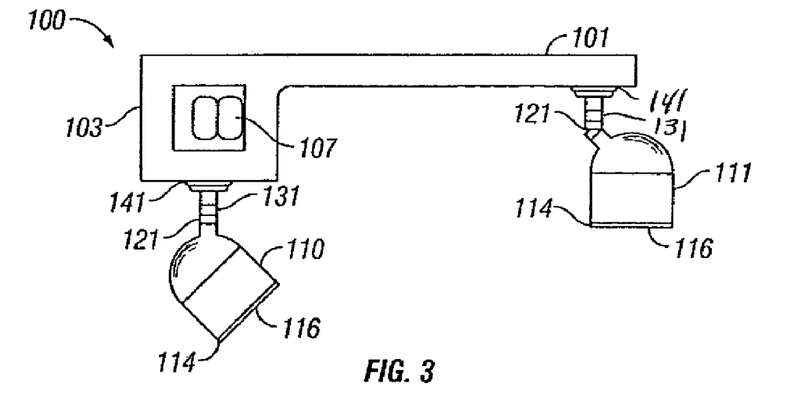
Figure 4:
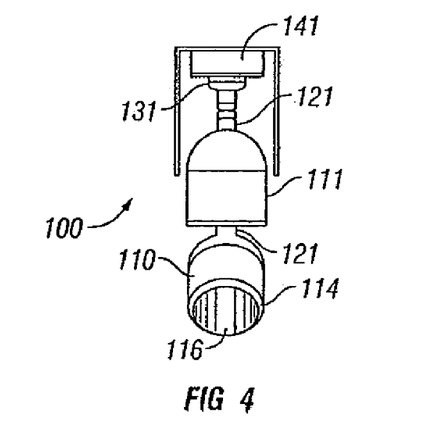

Additional details of backing apparatus 100 are provided in FIGS. 2, 3 and 4, which provide isometric, side and front views, respectively, of backing apparatus 100 of FIG. 1.

Support bracket 101 may be mounted to vehicle 215 utilizing any suitable means. Support bracket 101 may be relatively permanently mounted to vehicle 215, non-limiting examples of which include use of bonding materials, adhesives, screws, bolts, brackets, fasteners, or may be removeably mounted to vehicle 215, non-limiting examples of which include friction fit fasteners, quick release brackets, bracket docking systems, hook and loop fastener systems (for example, those sold under the brandname VELCRO), or as prefened and shown herein by magnetic coupler 103. It is also possible to manufacture vehicle 215 to make backing apparatus 100 integral to the vehicle.

The beauty of using a quick release mounting system such as magnet coupler 103, is that it allows for quick installation of backing system 100 in anticipation of backing, and then for quick removal (and subsequent storage) of backing system 100 upon completion of the backing operation.

One or more cameras are mounted to support bracket 101.

Figure 6:
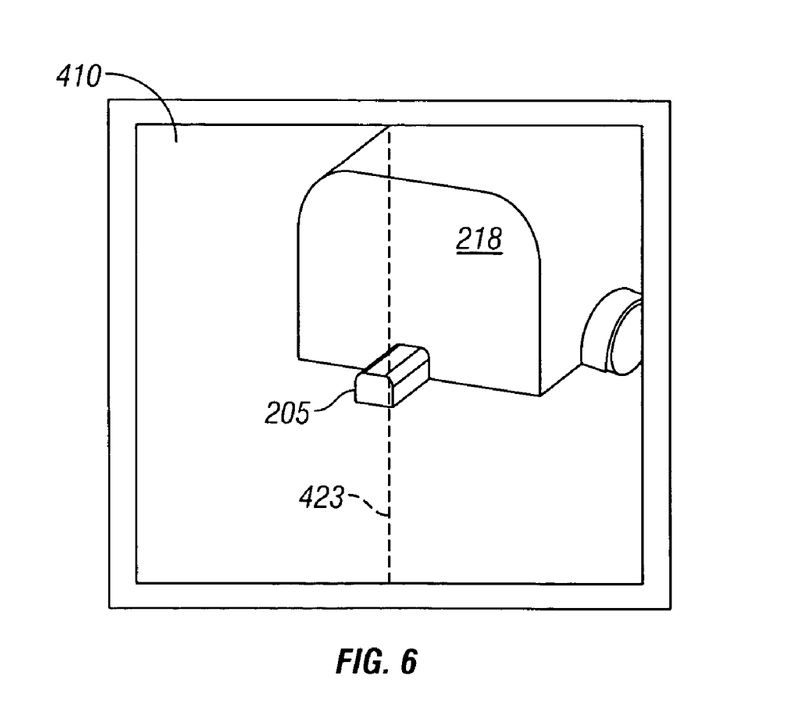
FIG. 6 is the display screen for camera 110, showing the backward view of trailer 218 and trailer tongue 205.

As shown in the figures, a generally backwardly pointed camera 110 is mounted to support bracket 101, with camera 110 providing a backward look at trailer 215. Referring additionally to FIG. 6, there is shown an illustration of display screen 410 for camera 110, showing the backward view of trailer 218 and trailer tongue 205. This view will assist in backing vehicle 215 toward trailer 218 until tongue 205 comes into view of camera 111.

Camera 110 further includes a camera mount 141, and swivel members 121 and 131, which are most likely a ball and socket joint to allow swivel of camera 110.

Camera mount 141 may be any suitable mounting means. Camera 110 may be relatively permanently mounted to bracket 101, non-limiting examples of which include use of bonding materials, adhesives, screws, bolts, brackets, fasteners, or may be removeably mounted to bracket 101, non-limiting examples of which include friction fit fasteners, sliding track, quick release brackets, bracket docking systems, hook and loop fastener systems (for example, those sold under the brand name VELCRO), or as preferred and shown herein by magnetic coupler 141. It is also possible to manufacture backing apparatus 100 to make camera 110 integral to the bracket.

Camera 110 is any suitable type of camera or image capture system, which will generally provide a video of the backing operation, which generally means obtaining a series of images in rapid succession of the backing operation, that is, moving graphical imagery of the backing operation. While the term "video" generally refers to moving graphical imagery recorded electronically as opposed "movies" which are recorded on film, as used herein, "video" refers to captured moving graphical imagery regardless of how recorded, transmitted, saved or stored.

Camera 110 is in communication with a display screen 410 positioned to be easily viewed by the operator of vehicle 215. This communication may be by a direct or wireless connection. Preferably camera 110 is in wireless communication with display screen 410.

As opposed to the prior art systems which are designed for daytime use, the present invention finds utility during both day and night. This is accomplished by providing infrared lighting and cameras which receive infrared light. Provision is also made to provide visible light to allow for manual operation of the trailer hitch.

Backing system 100 may include lights mounted to provide light to the backing operation, for example, supported by bracket 101, mounted to vehicle 215, or positioned apart from bracket 101 and vehicle 215. In the embodiment as shown, one or more lights 114 are mounted around the periphery of camera lens 116. The lights may be a visible light source, or an infrared light source, or any other suitable light source. A preferred visible light source includes a super white LED light. Preferably, the light source is an infrared light source or a visible light source. Most preferably the light source comprises both infrared light and visible light. Of course, camera 110 is suitable for the light source utilized and may provided with appropriate filters as necessary.

Figure 5:
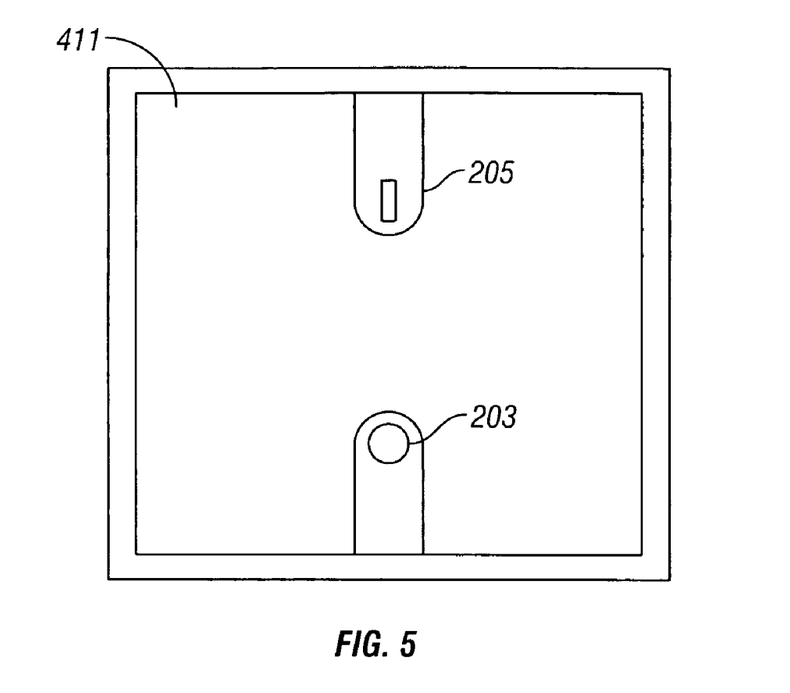
FIG. 5 is the display screen for camera 111, showing the downward view of trailer hitch 203 and trailer tongue 205.

As shown in the figures, a downwardly pointed camera 111 is mounted to support bracket 101, which camera 111 providing an overhead downward look at hitch 203. Referring additionally to FIG. 5, there is shown an illustration of display screen 411 for camera 111, showing the downward view of trailer hitch 203 and trailer tongue 205. It is this view that will allow for very precise maneuvering of trailer 218 to couple or nearly couple trailer hitch 203 and trailer tongue 205.

Generally during backing, the driver will maneuver the vehicle to keep the trailer tongue at or near the center of display screen 410. Display screen 410 may also comprise aiming indicia 433 to provide guidance during backing.

Camera 111, may be the same or different type of camera as camera 110 described above. The general requirements for camera 111 is generally the same as for camera 110, so the discussion above regarding camera 110 is applicable to camera 111, with perhaps the exception that camera 111 must be able to provide a clear picture of the hitch 203 and trailer tongue 205 from a very short distance, for example, on the order of a few feet or less, perhaps even less then a foot.

Thus, camera 111 similarly further includes a camera mount 141, and swivel members 121 and 131, which are most likely a ball and socket joint to allow swivel of camera 111.

Thus, camera 111 is mounted by suitable mounting means as described above for camera 110.

Similarly, camera 111 is in communication with a display screen 411 positioned to be easily viewed by the operator of vehicle 215. This communication may be by a direct or wireless connection. Preferably camera 111 is in wireless communication with display screen 411.

Figure 7:
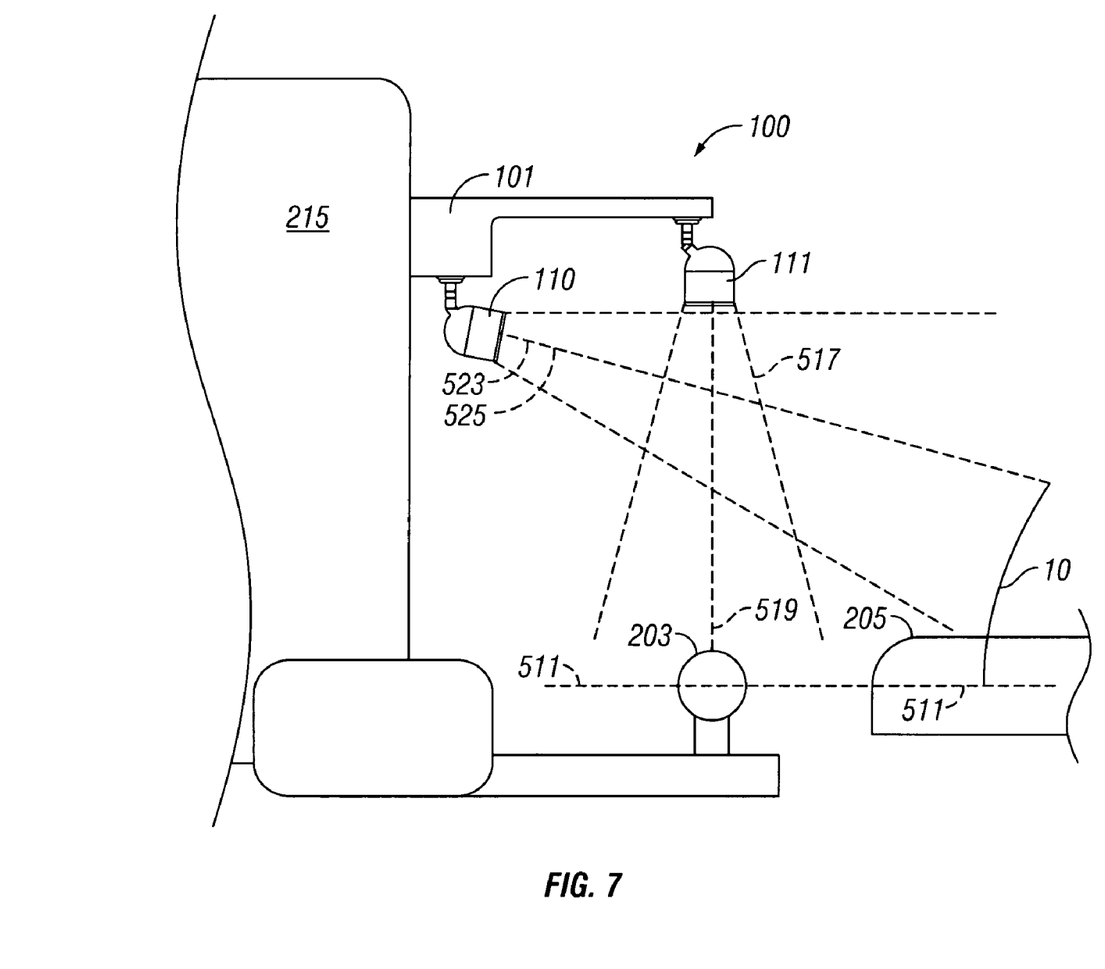
FIG. 7 is a detailed illustration of backing apparatus 100, with camera 110 field of view 523, and camera 111 field of view 517, and tongue travel line 511 and camera 111 field of view center line 519.

Referring additionally to FIG. 7, there is shown a detailed illustration of backing apparatus 100, with camera 110 field of view 523, and camera 111 field of view 517, and tongue travel line 511 and camera 111 field of view centerline 519.

In its simplest embodiment, the present invention may comprise at least one camera 111, which is generally positioned to provide an overhead field of view 517, which by the very nature of being directly mostly downwardly toward hitch 203 will exclude a view of trailer tongue 205 during the first portion of the backing operation, and will include a view of trailer tongue 205 only during the second portion of the backing operation. In fact, while it is possible to navigate vehicle 215 backward toward trailer 218 using mirrors and by looking over-the-shoulder, the last part of the backing operation is much more delicate. Thus, if one were to prioritize the cameras, it would be camera 111 that would be favored.

To avoid distortion of the view, camera 111 is generally positioned such that its field of view centerline 519 is generally perpendicular to tongue travel line 511. As used herein, generally perpendicular does not limit the present invention to 90 degrees, but rather includes a range around 90 degrees that will still allow for adequate viewing of the approach of hitch 203 to trailer tongue 205 without too much distortion as to cause problems for the driver in understanding the dimensions. While not wishing to limit that range to any particular number, non-limiting examples of ranges generally includes 90 degrees plus or minus 40 degrees, preferably includes 90 degrees plus or minus 30 degrees, more preferably includes 90 degrees plus or minus 20 degrees, even more preferably includes 90 degrees plus or minus 10 degrees, yet more preferably includes 90 degrees plus or minus 5 degrees. Thus, the present invention will include any positioning of camera 111 such that the centerline 519 will still allow for adequate viewing of the approach, including having the centerline 519 within the above ranges.

Camera 110 is generally positioned to provide a backward view from vehicle 215 of trailer 218. While it is possible for its field of view 523 to include a view of hitch 203, preferably, camera 110 is positioned such that its field of view is above and excludes a view of hitch 203. In a preferred positioning, camera 110 is positioned such that as the leading portion of trailer tongue 205 leaves camera 110 field of view 523, it enters or shortly thereafter enters camera 111 field of view 517.

Camera 110 field of view centerline 525 is generally positioned to be generally parallel to tongue travel line 511 or to form a relatively small angle 10 therebetween. Generally parallel does not require that the centerline 525 and tongue travel line 511 be exactly parallel, instead, camera 110 must be oriented toward trailer 218 so that the relative motion of trailer 218 toward vehicle 215 is not too distorted, and will allow the driver to guide vehicle 215 toward trailer 218. Generally, if centerline 525 and tongue travel line 511 are not parallel, they may form an angle 10 between them generally in the range of about 0.1 degrees to about 75 degrees, preferably in the range of about 0.1 to about 40 degrees, more preferably in the range of about 0.1 to about 25 degrees, even more preferably in the range of about 0.1 to about 15 degrees, and still more preferably in the range of about 3 to about 10 degrees.

In the first portion of the backing operation, reliance by the driver is from upon camera 110 which is utilized to provide a backward looking view to allow maneuvering of vehicle 215 generally toward trailer 218, with the idea to position tongue 205 somewhat in the center of the rear of vehicle 215 and thus near trailer hitch 203. At some point, which is the second portion of the backing operation, trailer tongue 205 is within the field of view of camera 111, at which point, reliance by the driver is upon camera 111 which is utilized to provide a very close view to allow close quarters maneuvering of hitch 203 close to or into coupling with trailer tongue 205.

While the monitor system of the present invention has been described as having two display screens 410 and 411, it should be understood that the monitor system of the present invention may comprise one display screen having a split screen display, one display screen which may be toggled between cameras 110 and 111 may be utilized, or one monitor for camera 110 and another monitor for camera 111.

Power to backing apparatus may be provided from vehicle 215, for example, by plugging into trailer light plug on the vehicle, or may be provided from a power source independent of vehicle 215. In the embodiment as shown in the figures, batteries 107 provide power to both camera 110 and camera 111.

One or both of cameras 110 and 111, may be provided with switching to allow for the visible light to be turned on manually to facilitate handling of the hitch coupling. For example, at night, the backing operation may be conducted using the infrared light 114 of cameras 110 and 111. Once the driver maneuvers vehicle 215 close enough to trailer 218, the driver will exit vehicle 215 and go to the rear of vehicle 215 to secure trailer hitch 203 and trailer tongue 205, hook up safety chains, and perhaps even make electrical connections between vehicle 215 and trailer 218. In the dark, this might require a flashlight or other light source. The present invention anticipates operation of any visible lights 114 to provide light for this securing operation.

While the present invention has been illustrated mainly by reference to the backing of a vehicle to couple a hitch and trailer, it should be understood that it finds utility for backing a vehicle into a space, a non-limiting example of which includes backing into a dock, or a narrow confined space, or to avoid, clear, or pass an object.

Very easily, one or both of cameras 110 and 111 may be removed from bracket 101 and mounted on vehicle 215 as desired, or even to trailer 218, or even to an object to be avoided (i.e., a post, building, obstruction, or another vehicle), or to a suitable vantage point to provide assistance, or in any other manner which would facilitate backing or coupling of a trailer/hitch.

Figure 8:
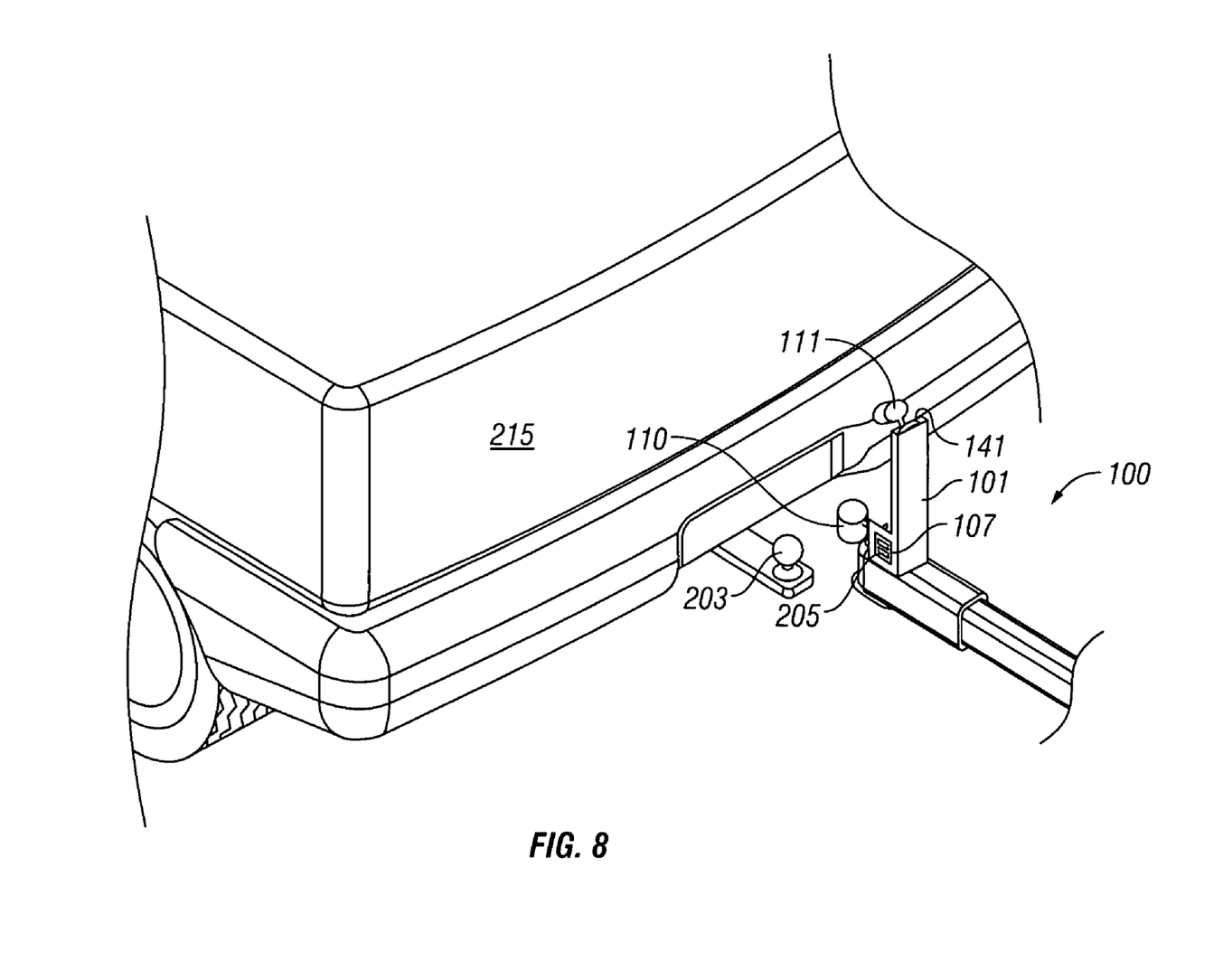
FIG. 8 is an illustration showing backing apparatus 100 mounted on trailer tongue, showing support bracket 101, mounted thereon camera 110 and camera 111, and vehicle 215.

While the present invention has been illustrated by mounting apparatus 100 on vehicle 215, it also finds utility mounting the backing apparatus on trailer 218 as shown in FIG. 8.

Figure 9:
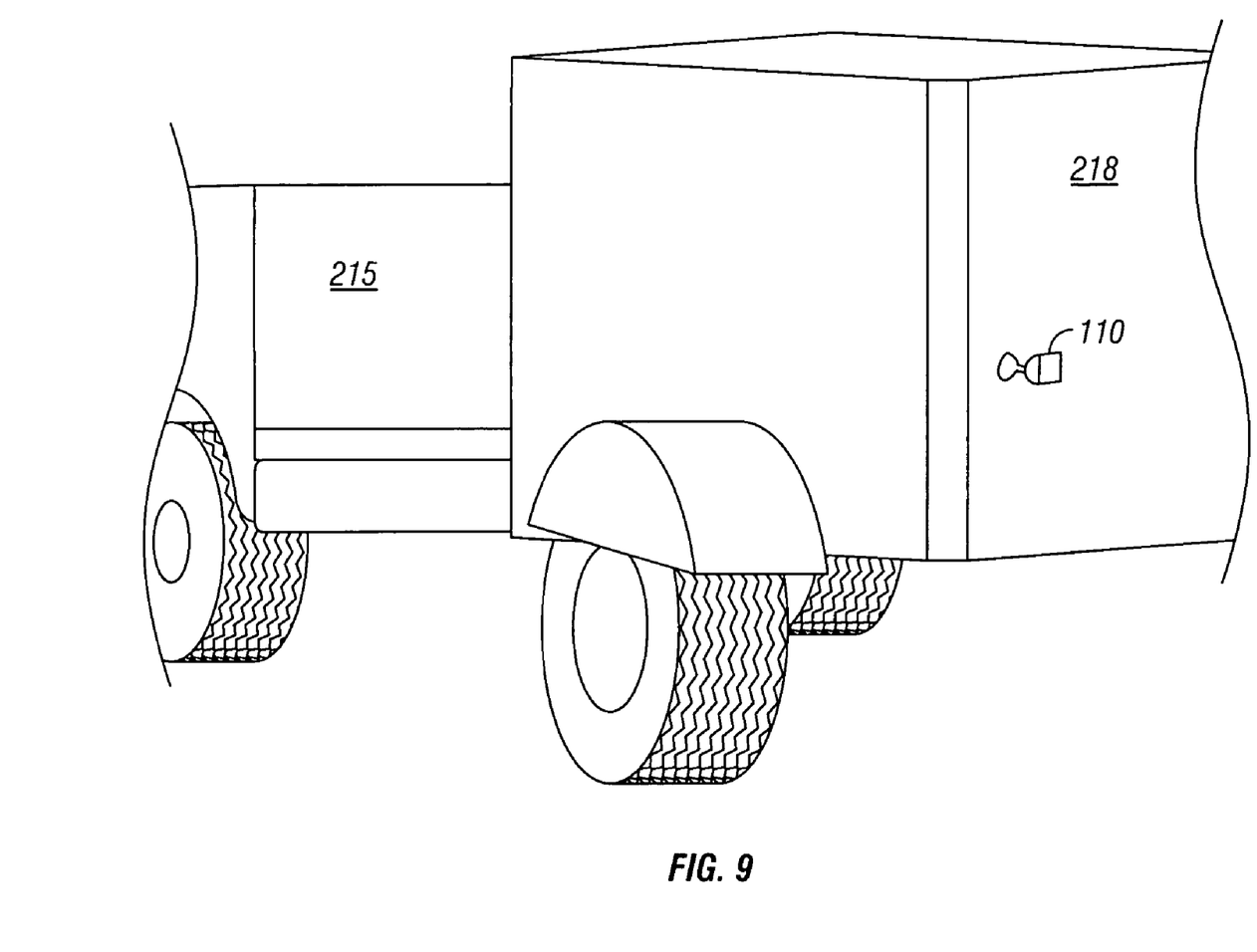
FIG. 9 is an illustration of the security embodiment of the present invention, showing one of camera 110 or camera 111 mounted on trailer 218.

Because cameras 110 and 111 are provided with infrared light sources and can receive/transmit infrared images, in a security embodiment of the present invention, they may be positioned either on bracket 101 or apart from bracket 101 in a manner to provide daytime or night time security observation of a vehicle, trailer or any other object. As non-limiting examples, the cameras may be positioned inside parked vehicle 215 to observe areas exterior to vehicle 215, including trailer 218, or may be positioned on vehicle 215 or on trailer 218 to observe as shown in FIG. 9, and transmit images to the monitor system, perhaps being observed by a driver while in a restaurant. If equipped with a motion activated alarm system, a warning signal may be provided to the remote monitor. This motion activated alarm system may also be in communication with and activate the vehicle's alarms system, and may also be in communication with and activate a vehicle engine kill switch to prevent starting of the engine.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains. Additionally, it should be understood that not all of the inventions described herein have been incorporated into the claims as originally filed, and that claims may be later added directed to other inventions described herein.

All patents and publications cited herein are hereby incorporated by reference for all that they teach and suggest.

What is claimed:

1. A vehicle backing apparatus for assisting in coupling a hitch supported by the vehicle with a trailer, the apparatus comprising:
    a first camera positioned to provide an image of the trailer;
    a second camera positioned to provide downward image of the hitch;
    a support bracket, wherein the first camera and the second camera are mounted on the support bracket, and wherein the first camera and the second camera are positioned on the support bracket so that the second camera is at a farther distance from the vehicle than the first camera; and
    a monitor system for displaying the image of the trailer and the image of the hitch.

2. The apparatus of claim 1, wherein the first camera is suitable for capturing both visible light images and infrared light images, and comprises an infrared light source supported by the first camera and a visible light source supported by the first camera.

3. The apparatus of claim 1, wherein at least one of the first camera or the second camera is adapted for positioning on the vehicle or the trailer to provide security monitoring of either the vehicle or the trailer.

4. The apparatus of claim 3, wherein at least one of the first or second cameras comprises a motion sensor.

5. A method of backing a vehicle with a hitch toward a trailer to couple the trailer with the hitch, the method comprising:
    mounting a first camera and a second camera on a support bracket;
    positioning the first camera and the second camera on the support bracket so that the second camera is at a farther distance from the vehicle than the first camera;
    viewing the trailer through the first camera while backing the vehicle toward the trailer; and
    viewing the hitch through the second camera while backing the vehicle toward the trailer.

6. The apparatus of claim 1, wherein the second camera is suitable for capturing both visible light images and infrared light images, and comprises an infrared light source supported by the second camera and a visible light source supported by the second camera.

* * * * *